(12) United States Patent
Lang (10) Patent No.: US 12,496,244 B2
(45) Date of Patent: *Dec. 16, 2025

(54) FIREMAN'S CARRY HARNESS

(71) Applicant: Jett J. Lang, Watkinsville, GA (US)

(72) Inventor: Jett J. Lang, Watkinsville, GA (US)

(*) Notice: Subject to any disclaimer, the term of this patent is extended or adjusted under 35 U.S.C. 154(b) by 1023 days.

This patent is subject to a terminal disclaimer.

(21) Appl. No.: 17/563,567

(22) Filed: Dec. 28, 2021

(65) Prior Publication Data

US 2022/0313524 A1 Oct. 6, 2022

Related U.S. Application Data

(63) Continuation of application No. 17/220,920, filed on Apr. 1, 2021, now Pat. No. 11,241,351.

(51) Int. Cl.
*A61G 7/10* (2006.01)
*A62B 5/00* (2006.01)

(52) U.S. Cl.
CPC .......... *A61G 7/1051* (2013.01); *A61G 7/1011* (2013.01); *A61G 7/1078* (2013.01); *A62B 5/00* (2013.01)

(58) Field of Classification Search
CPC .. A61G 7/1011; A61G 7/1038; A61G 7/1051; A61G 7/1078; A62B 5/00; A62B 35/0006; A01M 31/006; A01K 27/002; A01K 27/003
USPC ..................................... 224/158; 182/3, 6, 7
See application file for complete search history.

(56) References Cited

U.S. PATENT DOCUMENTS

| 641,375 | A | * | 1/1900 | Cornell | A62B 35/0012 224/161 |
| 1,490,066 | A | * | 4/1924 | Legatee | A45F 3/14 224/159 |
| 1,642,911 | A | * | 9/1927 | Thurnau | A62B 35/0006 224/268 |
| 2,302,997 | A | * | 11/1942 | Lucas | A62B 35/00 224/159 |
| 2,699,284 | A | * | 1/1955 | Rose | A62B 35/0037 119/857 |
| 2,960,180 | A | * | 11/1960 | Wachtel | A62B 35/0006 297/468 |
| 2,979,028 | A | * | 4/1961 | Zakely | A62B 35/0018 297/484 |
| 3,038,644 | A | * | 6/1962 | Johnson | A01M 31/00 224/259 |
| 3,322,102 | A | * | 5/1967 | Windle | A62B 35/0006 244/151 R |
| 4,197,816 | A | * | 4/1980 | Lusch | A62B 35/0006 182/6 |
| 4,667,624 | A | * | 5/1987 | Smith | A47D 13/086 119/857 |

(Continued)

*Primary Examiner* — David R Hare
(74) *Attorney, Agent, or Firm* — Smith Tempel Blaha LLC; Gregory Scott Smith (57) ABSTRACT

A harness assembly to assist in and secure a fireman's carry of a victim. The harness assembly includes an adjustable strap to be secured around the victim and an adjustable strap to be secured over the shoulder and under the armpit of a carrier. A harness system includes two harness assemblies with one harness assembly being attached around a leg of the victim and one shoulder of the carrier and the other harness assembly being attached around the chest of the victim and the other shoulder of the carrier. The straps are adjustable so that they can be cinched.

19 Claims, 6 Drawing Sheets

(56) References Cited

U.S. PATENT DOCUMENTS

| | | | | |
|---|---|---|---|---|
| 5,351,654 | A * | 10/1994 | Fuentes | A01K 27/00 D30/153 |
| 5,842,444 | A * | 12/1998 | Perrulli | A01K 27/003 119/857 |
| 5,896,859 | A * | 4/1999 | Carroll | A61G 7/1023 128/845 |
| 6,752,242 | B1 * | 6/2004 | Whitehead | A62B 35/0075 182/9 |
| 7,103,943 | B2 * | 9/2006 | Lambert | A01K 27/001 24/298 |
| 8,015,619 | B2 * | 9/2011 | McKay | A62B 35/0006 2/69 |
| 10,603,528 | B1 * | 3/2020 | Bologna | A62B 35/0006 |
| 11,013,653 | B1 * | 5/2021 | Atkins | A61G 7/104 |
| 11,241,351 | B1 * | 2/2022 | Lang | A61G 7/1078 |
| 11,577,103 | B1 * | 2/2023 | Candela | A62B 5/00 |
| 2009/0078501 | A1 * | 3/2009 | Mordecai | A41D 13/0007 182/7 |
| 2010/0243372 | A1 * | 9/2010 | Wilkinson | A62B 35/0006 224/184 |
| 2015/0021118 | A1 * | 1/2015 | Doty | A62B 35/0006 182/3 |
| 2016/0015584 | A1 * | 1/2016 | Choudhury | A61G 7/1038 5/81.1 R |
| 2016/0183666 | A1 * | 6/2016 | Whitehill | A45C 13/30 224/578 |
| 2021/0093905 | A1 * | 4/2021 | Kushniruk | A62B 35/0006 |

\* cited by examiner

FIREMAN'S CARRY HARNESS

BACKGROUND

A fireman's carry, also referred to as a fireman's lift, is a rescue technique that allows a single person to transport a wounded, non-ambulatory, unconscious, etc. person, usually out of a perilous environment to a safer environment. To lift and carry a person using the fireman's carry technique, the following procedures are typically performed: (1) roll the victim onto their stomach; (2) kneel down by the victims head; (3) stick your arms under their armpits and around their back; (4) raise the victim to a standing position as you stand up, remembering to lift with your legs, not with your back; (5) while in the standing position, move your right leg between the victim's legs and shift your weight to the right leg; (6) grab the victim's right hand with your left hand, and drape it over your right shoulder; (7) with your head under the victim's right armpit, wrap your right arm around the back of the victim's right knee; (8) holding the victim's right hand with your left hand, squat down and position the victim's body on your shoulders; (9) try to equally distribute the victim's body weight on each side of your shoulders then raise back up to a standing position moving the victim's right arm to a position to be grasped by your right hand.

Utilizing the fireman's carry to transport a victim has several advantages over other methods of moving a victim. For instance, using the fireman's carry, the victim's body is fairly level, which helps prevent further injuries. When the victim's weight is evenly distributed over both shoulders, it is easier to carry the victim for longer distances. Further, utilizing a fireman's carry, the victim's body is relatively supported on the shoulders of the rescuer, and as such, the victim experiences less jarring than in a single-shoulder carry. In a single-shoulder carry, the victim is bent over the shoulder of the rescuer and as such, the victim's head is generally below their body. This position can result in an uneven distribution of the victim's blood and, if the victim has experienced head trauma, the single-shoulder carry can exasperate the seriousness of the injury.

The fireman's carry is also advantageous in that the rescuer is only required to use one hand to carry the victim, thus freeing up the other hand to carry other items or to hold on to support structures, such as a stair railing, a ladder rung, etc.

However, there are also disadvantages of using the fireman's carry, especially in a firefighting environment. When escaping a burning building, smoke and heat are increasingly more prevalent as you move a victim from the floor to shoulder level. Because the fireman's carry lifts the victim to the shoulders of the rescue worker, the victim is forced into an area where there is more smoke and heat. Thus, being held in this position for a prolonged period may be fatal to the victim.

Another disadvantage is that the victim, once placed into a fireman's carry, is significantly outside the rescuer's field of vision, and almost all vital areas are out of the rescuer's view. It can be appreciated then that critical changes in the condition of the victim may go unnoticed, and an inexperienced rescuer can inadvertently create or further compound injuries via collision with obstacles. Furthermore, due to the positioning of the victim, the rescuer's peripheral vision is obstructed. This unfortunately puts both the rescuer and the victim at risk if the incident that caused the injury is still ongoing or there are obstacles in the path towards safely. Further, it is also more difficult to get a victim onto a rescuer's shoulders than it is to drag a victim by their shoulders while reaching under their armpits.

Thus, while it can be appreciated that there are great advantages to using a fireman's carry to transport a victim to safety, there are also some significant disadvantages. Thus, what is needed in the art is a device that can improve the advantages of using a fireman's carry and alleviate one or more of the disadvantages associated with the fireman's carry. The present invention addresses these and other needs in the art.

BRIEF SUMMARY

An embodiment of the harness system to assist in a fireman's carry includes two harness assemblies. In one embodiment, the harness assembly includes two adjustable straps. A first adjustable strap is configured to be looped and secured around a body part of a victim. A second adjustable strap is configured to be looped and secured around the shoulder and under arm of a carrier. Further, a coupler, such as a slide fastener as a non-limiting example, is configured to couple the first adjustable strap to the second adjustable strap. Using a coupler such as a slide fastener allows one or more of the straps to slide or be adjusted through the slide fastener, while other couplers may ensure that one or both of the straps are stationary or fixed relative to the coupler or each other.

Embodiments of the harness system may utilize two such harness assemblies. As such, the second adjustable strap of the first harness assembly can be looped and secured around the left shoulder and armpit of the carrier when the first adjustable strap of the first harness assembly is looped and secured around a left leg of a victim or the second adjustable strap of the first harness assembly is configured to be looped and secured around the right shoulder and armpit of the carrier when the first adjustable strap of the first harness assembly is looped and secured around a right leg of a victim. Further, the first adjustable strap of the second harness assembly can be looped and secured around the chest of the victim and the second adjustable strap of the second harness assembly can be looped and secured around the shoulder and armpit of the carrier that is opposite of the shoulder and armpit associated with the first harness assembly.

These and other embodiments of the harness assembly and harness system are presented in more detail in the following detailed description.

DETAILED DESCRIPTION OF VARIOUS EMBODIMENTS

The present invention, as well as features and aspects thereof, is directed towards providing a harness assembly, a harness system utilizing two of the harness assemblies and a method of using the harness system to assist in the securement and carrying of a victim transported using a fireman's carry. In general, the embodiments of the present invention meet and exceed the needs in the art by securing a victim in the fireman's carry thus preventing the carrier from inadvertently dropping the victim. Further, the embodiments of the present invention allow the carrier to have both arms free for removing obstacles from the path, holding onto support structures to stabilize the transportation of the victim and even applying pressure to the victim's wounds or otherwise care for the victim. Further, because the victim is secured into the fireman's carry and the carrier has two free arms, the carrier is able to more rapidly extract the victim from the perilous environment and thus, minimize the impact of smoke and heat on the victim in a fire scenario.

In the description and claims of the present application, each of the verbs, "comprise," "include" and "have," and conjugates thereof, are used to indicate that the object or objects of the verb are not necessarily a complete listing of members, components, elements or parts of the subject or subjects of the verb.

One embodiment includes a harness assembly. It is noted that the single-harness assembly can be utilized by itself to assist in the carrying and securing a victim transported using a fireman's carry or, two harness assemblies may be used simultaneously as a harness system. As such, the details of a single-harness assembly described embodiment are applicable to a single-harness assembly usage or a double harness assembly usage. Further, it should be appreciated that in some embodiments, two harnesses or equivalents thereof can be integrated into a single unit.

The harness assembly comprises two adjustable straps that are coupled together, or in some embodiments, can be coupled together using a variety of techniques. The straps may be coupled together in a manner that allows the adjustable straps to slide relative to each other (such as by using the slide buckle illustrated in FIG. 3) or one or both of the adjustable straps can be coupled together such that they cannot freely slide but rather are fixed relative to the slide buckle or each other. For instance, the two adjustable straps can be sewn, stapled, welded or melded together, or using some other technique, to secure the adjustable straps relative to each other. As another non-limiting example, one or both of the straps can be looped through one of the openings of the slide buckle 300 illustrated in FIG. 3, and then sewn, stapled, welded or melded to itself, or using some other technique, such that the adjustable strap cannot move further than the loop. In other configurations, the adjustable straps may be configured such that they can move only a fixed distance relative to each other.

Figure 1:
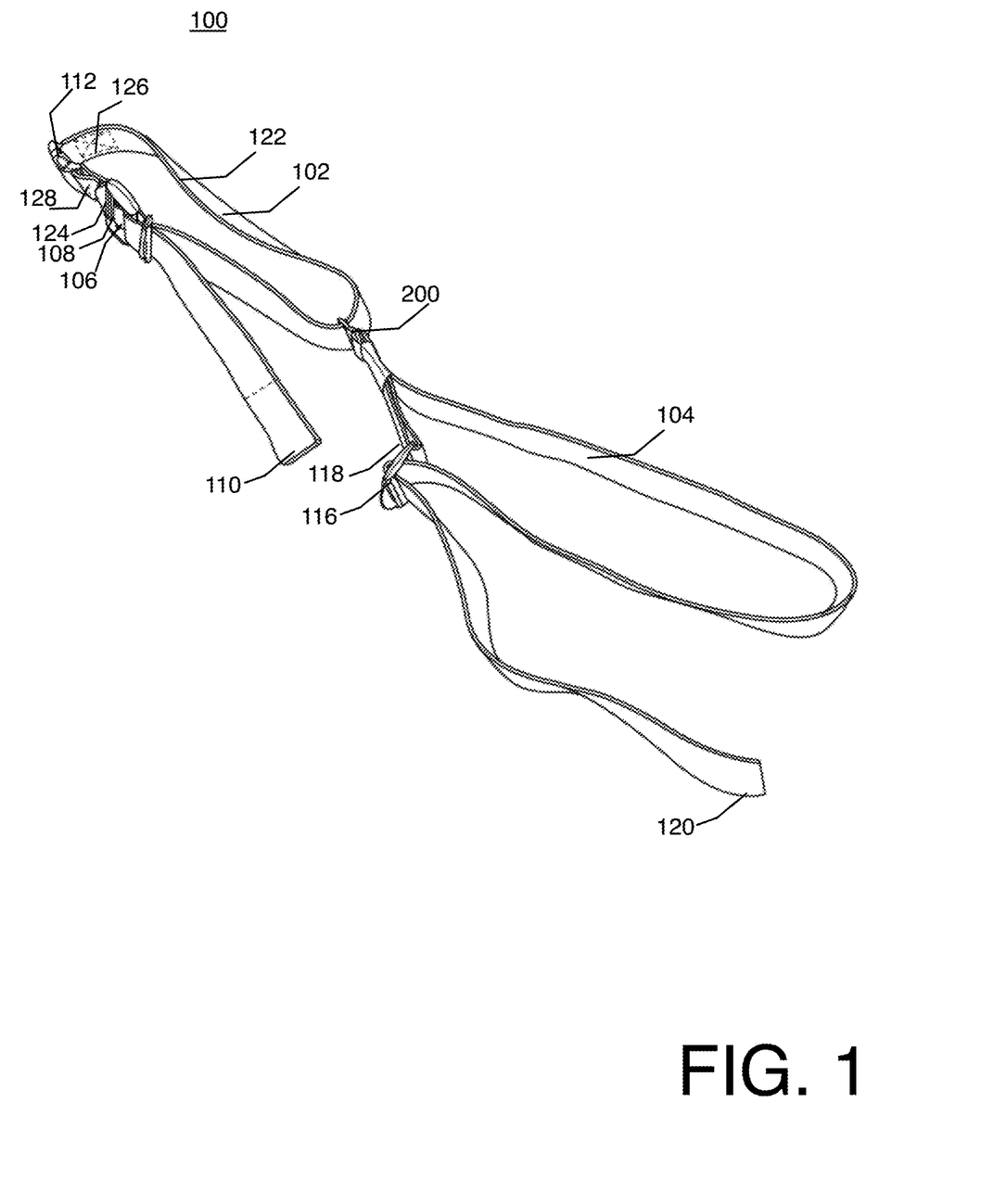
FIG. 1 illustrates a two-strap adjustable harness assembly that can be used in a secured fireman's carry.
Figure 2:
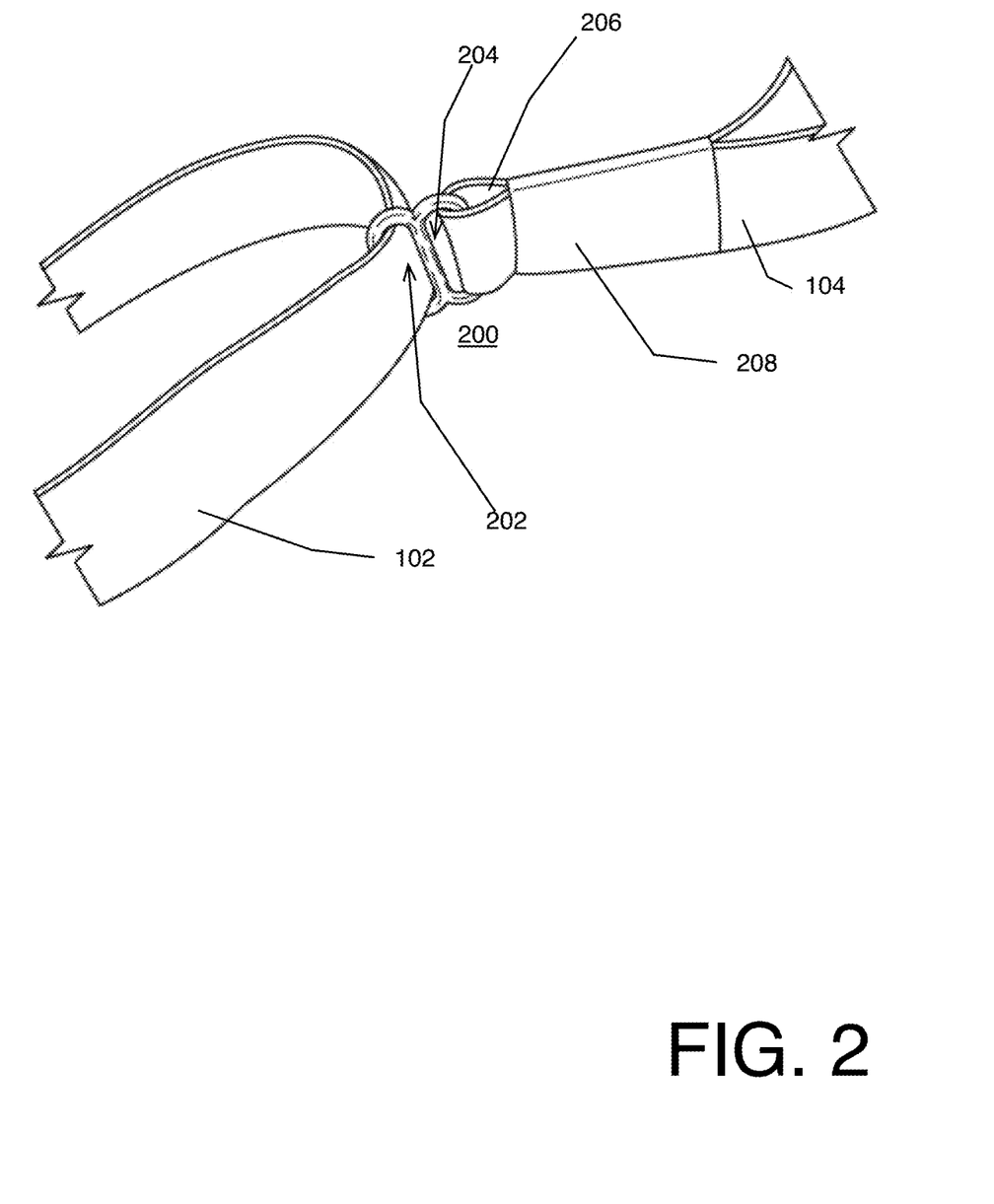
FIG. 2 is a close-up view of the first adjustable strap being coupled to a second adjustable strap in an exemplary embodiment.
Figure 3:
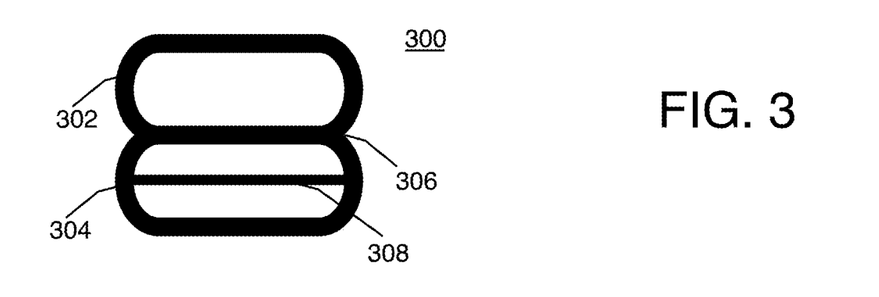
FIG. 3 is an exemplary embodiment of a slide fastener that can be utilized in various embodiments of the harness assembly.

The adjustable straps are configured to create a loop and defining an opening through the loop. As such, the adjustable strap can be secured around an object, such as a body part. FIG. 1 illustrates a two-strap adjustable harness assembly that can be used in a secured fireman's carry. Referring to FIG. 2, the first adjustable strap 102 is threaded through a first opening 202 in the slide fastener 200 and the second adjustable strap 104 is threaded through a second opening 204 in the slide fastener 200. FIG. 3 illustrates, as a non-limiting example, a slide fastener 300 that can be utilized as the slide fastener 200 in such embodiments. The illustrated slide fastener 300 includes a first loop or ring 302 and a second loop or ring 304 joined together by a bar 306 or welded or coupled in some other manner. Once the first adjustable strap 102 and the second adjustable strap 104 are threaded through the rings 302 and 304 respectively of the slide fastener 200, one or both of the adjustable straps can then be sewn, stapled, welded or melded to itself, or using some other technique, such that the adjustable strap has a limited amount of movement relative to the slide fastener 200. In the illustrated embodiment, the second adjustable strap 104 is shown as having a loop 206 that is secured around one of the rings of the slide fastener 200 and then secured to itself using a band 208. In this embodiment, the strap 104 is secured to the slide fastener 200 such that it is free to move within the confines of the loop 206. It should be appreciated that by increasing the size of the loop 206, more movement of the strap relative to the slide fastener 200 can be achieved. Likewise, reducing the size of the loop 206 can constrain the movement of the strap relative to the fastener 200. It should also be appreciated that a different slide fastener configuration can be utilized that allows the strap to be adjusted to different settings. For instance, looking again at FIG. 3, one or more of the rings, such as ring 304, may include a bar 308 that extends from one side of the ring to the other. The strap can be threaded through the ring 304 and around the bar 308 thus allowing the strap to be adjusted but once in place, provides a friction hold to retard sliding of the strap during use (i.e., after the strap has been cinched around an object).

Figure 4:
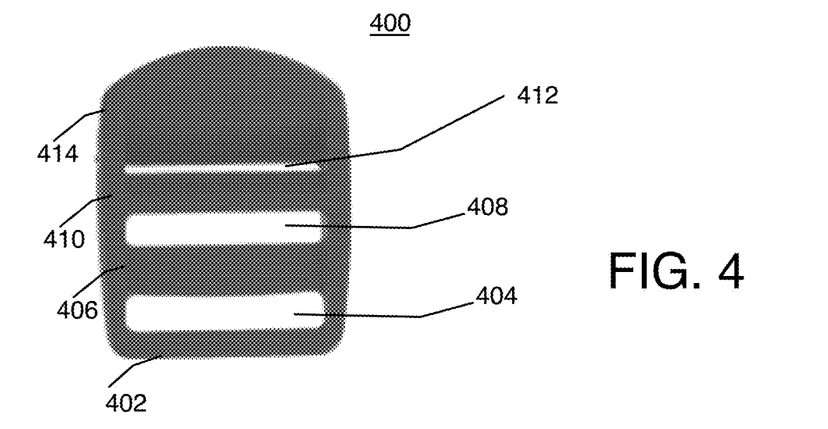
FIG. 4 is an exemplary embodiment of an adjustable buckle that can be utilized in various embodiments of the harness assembly.

Each of the adjustable straps can include an adjustable buckle, such as the adjustable buckle 400 illustrated in FIG. 4 as a non-limiting example. One end of the adjustable strap can be secured to the bar 402 of the buckle through opening 404, while another end of the strap can be fed through the openings 408 and 412 defined by the bars 406 and 410 and the frame 414 of the buckle 400. Thus, by pulling on the loose end of the adjustable strap, the size of the loop formed by the adjustable strap can be adjusted to cinch the adjustable strap to an object. Further, by pulling on the adjustable buckle, the adjustable strap can also be loosened.

Figure 5:
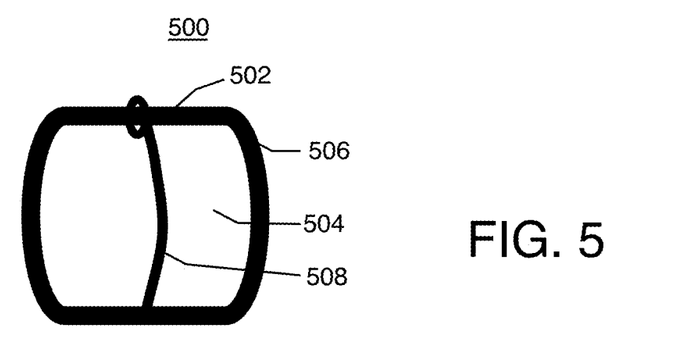
FIG. 5 is an exemplary embodiment of another adjustable buckle that can be utilized in various embodiments of the harness assembly.

It should be appreciated that other structures may be used to make the adjustable strap adjustable and the use of the afore-described adjustable buckle 400 is just one non-limiting example. As another non-limiting example, a belt-like buckle 500 as illustrated in FIG. 5 can be utilized. In this exemplary embodiment, one end of the adjustable strap can be attached to the bar 502 while the other end of the adjustable strap can be fed through the interior 504 of the frame 506. In such an embodiment, the adjustable strap may include one or more apertures through which the prong 508 of the belt buckle can be inserted and thereby securing the adjustable strap in one or more adjustable positions. Other buckles and structures may also be utilized such as army-style buckles, slide buckles, cinch buckles, as well as other non-limiting examples.

Turning now to FIG. 1, an exemplary embodiment of the harness assembly is described in more detail. FIG. 1 illustrates a two-strap adjustable harness assembly that can be used in a secured fireman's carry. The harness assembly 100 is illustrated as including a first adjustable strap 102 and a second adjustable strap 104. The adjustable straps 102 and 104 can be constructed of a variety of materials as long as the materials are sufficiently strong enough to support an amount of weight necessary to lift a person without significantly stretching or snapping. The adjustable straps 102 and 104 should be of a width sufficient enough to provide a level of comfort to a victim and a carrier and not cut into the flesh of either under pressure. As non-limiting examples, the straps can be constructed from nylon straps, leather straps, braided material, plastic, poly, hemp, synthetics, hybrids or the like. In some embodiments, multiple straps or strings may also be utilized in either a braded, webbed or loose configuration. In some embodiments, the strap should be approximately 0.5 inches wide to 2 or more inches wide, although some embodiments may accommodate narrower or wider straps. The straps should be constructed with a thickness commensurate to accommodate the necessary lifting weight. The straps may be of a uniform width and thickness but it should be understood that straps without a uniform width and/or thickness may also be utilized.

The tensile strength of the straps needs to be sufficient to enable a victim to be lifted and secured in position without deforming significantly and without breaking. Tensile strength is defined as the stress level at which the strap breaks or permanently deforms. Tensile strength includes three aspects: yield strength, ultimate strength and breaking strength. The yield strength of a strap is the stress level at which the material strain changes from elastic deformation to plastic deformation, causing it to deform permanently. The ultimate strength of a strap is the maximum stress level a material can withstand when subjected to tension, compression or shearing (i.e., it is the maximum stress on the stress-strain curve). The breaking strength of a strap is the stress level coordinate on the stress-strain curve at the point of rupture of the strap.

The tensile strength of a strap is dependent upon several parameters including the material of the strap, the width of the strap and the thickness of the strap. While a variety of straps with various tensile strengths may be utilized in various embodiments, the minimum break strength of the straps utilized in various embodiments should be 250 to 300 pounds or more and preferably 400 pounds or more to ensure safety.

As the harness assemblies may be utilized in a variety of adverse environments, such as fire, extreme cold weather, wet conditions, etc., a material that is able to withstand adverse environments should be selected. For instance, a fire retardant material or a material treated with fire retardant protection should be utilized. Further, the material should remain flexible in extreme cold environments and not become brittle.

The first adjustable strap 102 is to be secured around a body part of a victim, such as the victim's leg, arm, waist, chest, etc. In the illustrated embodiment, the first adjustable strap includes an adjustable buckle 106, which may be structured similar to the adjustable buckles illustrated in FIGS. 3-5 or other variants thereof. A first end of the first adjustable strap 108 is attached to one side of the adjustable buckle 106, and the second end of the strap 110 is threaded through the adjustable portion of the adjustable buckle 106. Thus, the first adjustable strap 102 can be cinched around an object by placing the loop of the first adjustable strap 102 around the object and pulling the second end 110 of the first adjustable strap 102. The first adjustable strap 102 can be loosened by pulling on the adjustable buckle 106 in the direction of the second end 110.

The second adjustable strap 104 is structured similar to the first adjustable strap in that it is also illustrated as including an adjustable buckle 116. Similar to the first adjustable strap, a first end 118 of the second adjustable strap 104 is illustrated as being fixedly connected to one side of the adjustable buckle 116 and a second end 120 of the second adjustable strap 104 is illustrated as being threaded through the adjustable buckle 116. Thus, the second adjustable strap 104 can be cinched around an object by placing the loop of the second adjustable strap 104 around the object and pulling the second end 120 of the second adjustable strap 104. The second adjustable strap 104 can be loosened by pulling on the adjustable buckle 116 in the direction of the second end 120.

Figure 6:
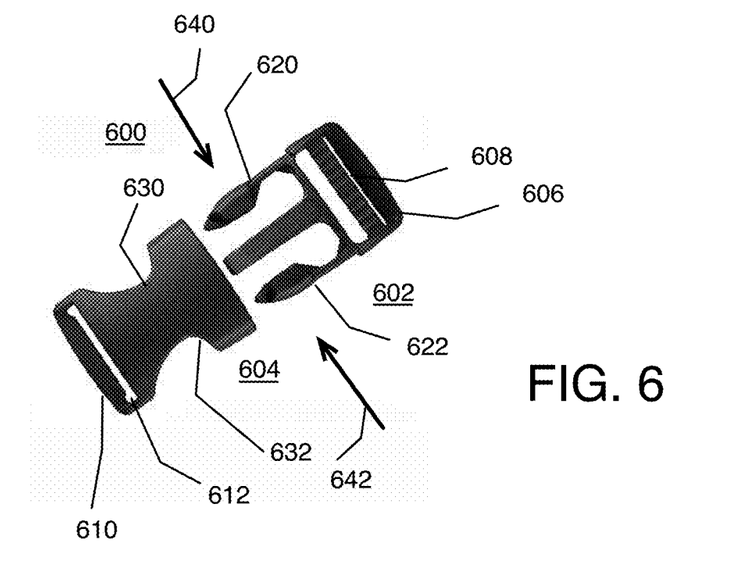
FIG. 6 illustrates a non-limiting example of an adjustable buckle that can be used as the connection securement device in various embodiments of the harness assembly.

In the illustrated embodiment, the first adjustable strap 102 is also illustrated as including a connection securement device 112, which may take the form of an attachable buckle, similar to the attachable buckle 600 illustrated in FIG. 6 as a non-limiting example. The illustrated attachable buckle 600 includes a male insert or plug 602 and a female receptor 604. In such an embodiment, the first adjustable strap 102 may be divided into two segments, first segment 122 and second segment 124. Segment 122 includes a first end 126 that is attached to or coupled to one end of the attachable buckle or connection securement device 112. The second end of segment 122 is the second end 110 of the first adjustable strap 102. As such, segment 122 attaches to one end of the securement device 112, is thread through the adjustable buckle 106 and then extends freely from the loop. The second segment 124 is attached to or coupled to the other end of the connection securement device 112 on a first end 128 and to the adjustable buckle 106 on the other end, which is end 108 of the first adjustable strap.

FIG. 6 illustrates a non-limiting example of an adjustable buckle 600 that can be used as the connection securement device 112. In an exemplary embodiment, the first end 126 of the first segment 122 of the first adjustable strap 102 can be attached to a bar 606 of the male insert 602. For example, the first end 126 of the first segment can be threaded through an opening 608 in male insert 602 and looped around the bar 606, then secured to itself to form a loop. The first end 126 can be secured to the first segment 122 by being sewn, stapled, glued, melded, welded, snapped or buckled as non-limiting examples. It should be understood that the connection of the first end 126 to the segment 122 should be such that the joint can withstand pressure being applied to it without breaking apart. For instance, the joint should be made strong enough to preferably equal, or be approximant to the breaking strength of the adjustable strap or at least the minimum breaking strength threshold of the harness assembly 100.

Similarly, one end 128 of the second segment 124 is attached to or coupled to the bar 610 of the female receptor 604. Thus, one end 128 of the second segment 124 is threaded through an opening 612 in the female receptor 604 and looped around the bar 610, then secured to itself to form a loop similar to any of the techniques described above or other techniques and adhering to the breaking strength requirements.

The attachable buckle 600 is illustrated as including a locking mechanism on the male plug 602 that includes two spring prongs 620 and 622, that are inserted into the female receptor 604 and held into position by respective locks 630 and 632. For instance, the spring prongs 620 and 622 can be compressed in the directions of arrows 640 and 642 respectively and slid into the female receptor 604. Once in position, the spring prongs 620 and 622 will spring and snap into the respective locks 630 and 632. The attachable buckle 600 can also be released by again compressing the spring prongs 620 and 622 in the directions of arrows 640 and 642 and then pulling the male plug 602 away from the female receptor 604. It should be appreciated that the attachable buckle 600 and the locking mechanism should be constructed of a material that is preferably equal, or approximant to the breaking strength of the first adjustable strap 102 or wiring harness 100. A variety of materials may be utilized for the attachable buckle, such as nylon or metal as long as the breaking strength requirements are met. Preferably, the material used for the attachable buckle 600 will be selected to withstand any adverse environmental conditions such as extreme heat, fire, moisture, extreme cold, etc.

It will be understood that other mechanisms may be utilized for the connection securement device 112. A few non-limiting examples include a carabiner and a loop, two carabiners, a hook and loop, a hook and loop material such as VELCRO, cargo strap ratchet, etc.

It should be appreciated that in some embodiments, the second adjustable strap 104 of the harness assembly 100 may include a connection securement device similar to the above-described structure for the connection securement device 112 for the first adjustable strap 102.

The first adjustable strap 102 is illustrated as being attached to or coupled to the second adjustable strap. In the embodiment illustrated in FIG. 1 and best seen in FIG. 2, a slide buckle or fastener 200 is utilized to couple the first adjustable strap 102 to the second adjustable strap 104 such that each strap can slide through an eyelet of the slide fastener 200. FIG. 3 is an illustration of one embodiment of a slide fastener 300 that could be utilized in the embodiment of the harness assembly illustrated in FIG. 1 and FIG. 2.

As illustrated in FIG. 2, the first adjustable strap 102 is threaded through a first opening 202 in the slide fastener 200 and the second adjustable strap 104 is threaded through a second opening 204 in the slide fastener 200. In some embodiments, the first adjustable strap 102 and the second adjustable strap 104 may be free to slide through the slide fastener 200. In some embodiments, such as the embodiment illustrated in FIG. 1 and FIG. 2, one of the adjustable straps (i.e. the second adjustable strap 104 in the illustrated embodiment) may be secured such that the strap does not freely slide through the slide fastener 200. For instance, in the illustrated embodiment, the second adjustable strap 104 is illustrated as defining a loop 206 that is threaded through the opening 204 and then secured to itself at area 208 such that the second adjustable strap 104 is prevented from sliding through the opening 204. It should be appreciated that in some embodiments, both the first adjustable strap 102 and the second adjustable strap 104 or either of the first and second adjustable straps can be configured to freely slide through the slide fastener 200 or be configured such that they cannot slide through the slide fastener 200. In the preferred embodiment, but not limited thereby, the first adjustable strap 102 is configured to slide freely through the slide fastener 200 while the second adjustable strap 104 is configured to not freely slide through the slide fastener 200. The motivation driving the preferred embodiment is to allow the first adjustable strap 102 to be quickly looped around a body part of the victim without concern for the exact positioning of the first adjustable strap 102, and then the slide fastener 200 can freely slide along the first adjustable strap 102 such that it can be readily positioned to an area lying between the victim and the carrier (i.e., proximate to the carrier's shoulder). The second adjustable strap 104 which is then looped around the carrier's shoulder and armpit is fixedly attached to the slide fastener 200 to ensure that the adjustable buckle 116 is in the proper position to allow the carrier to cinch the second adjustable strap 104 around the shoulder and armpit.

It should be appreciated that the slidable fastener illustrated in FIGS. 1-3 is a non-limiting example of a structure to couple the first adjustable strap 102 to the second adjustable strap 104. In some embodiments, the first adjustable strap 102 and the second adjustable strap may be fixedly joined together by being sewn, glued, tied, or stapled as non-limiting examples. Further, in some embodiments a ring may be utilized to couple the first adjustable strap 102 to the second adjustable strap.

In operation, the harness assembly is utilized to secure a body portion of a victim to the carrier. In some embodiments, a single harness assembly may be utilized while in other embodiments, two harness assemblies can be utilized in a harness system. While a single harness assembly can be used to improve the effectiveness of a fireman's carry, the use of two harness assemblies provides the most securement of the victim. As such, the operational use of a two-harness system will be described but it should be appreciated that using a single-harness assembly may be selected to be more expedient in some scenarios.

Figure 7:
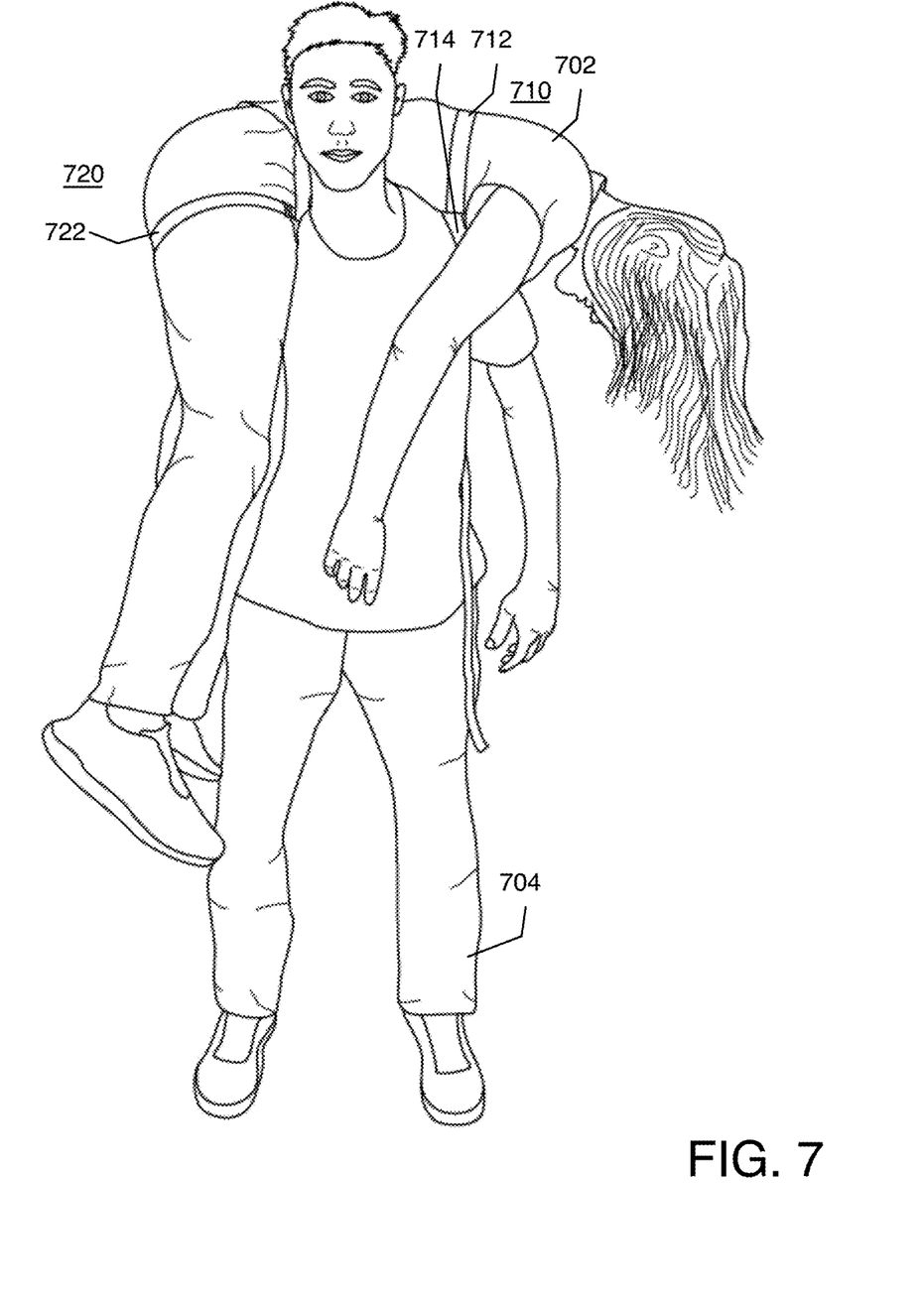
FIG. 7 is a conceptual diagram of a two-harness assembly system in operation.

FIG. 7 is a conceptual diagram of a two-harness assembly system in operation. In the illustrated embodiment, a victim 702 is depicted as being carried by a carrier 704 in the classic fireman's carry. A first harness assembly 710 is illustrated with the first adjustable strap 712 being secured around the chest of the victim 702 and the second adjustable strap 714 being secured around the left shoulder and armpit of the carrier 704. Further, a second harness assembly 720 is illustrated with the first adjustable strap 722 being secured around the right leg of the victim 702 and the second adjustable strap (not seen) is secured around the right shoulder and armpit of the carrier 704.

Figure 8:
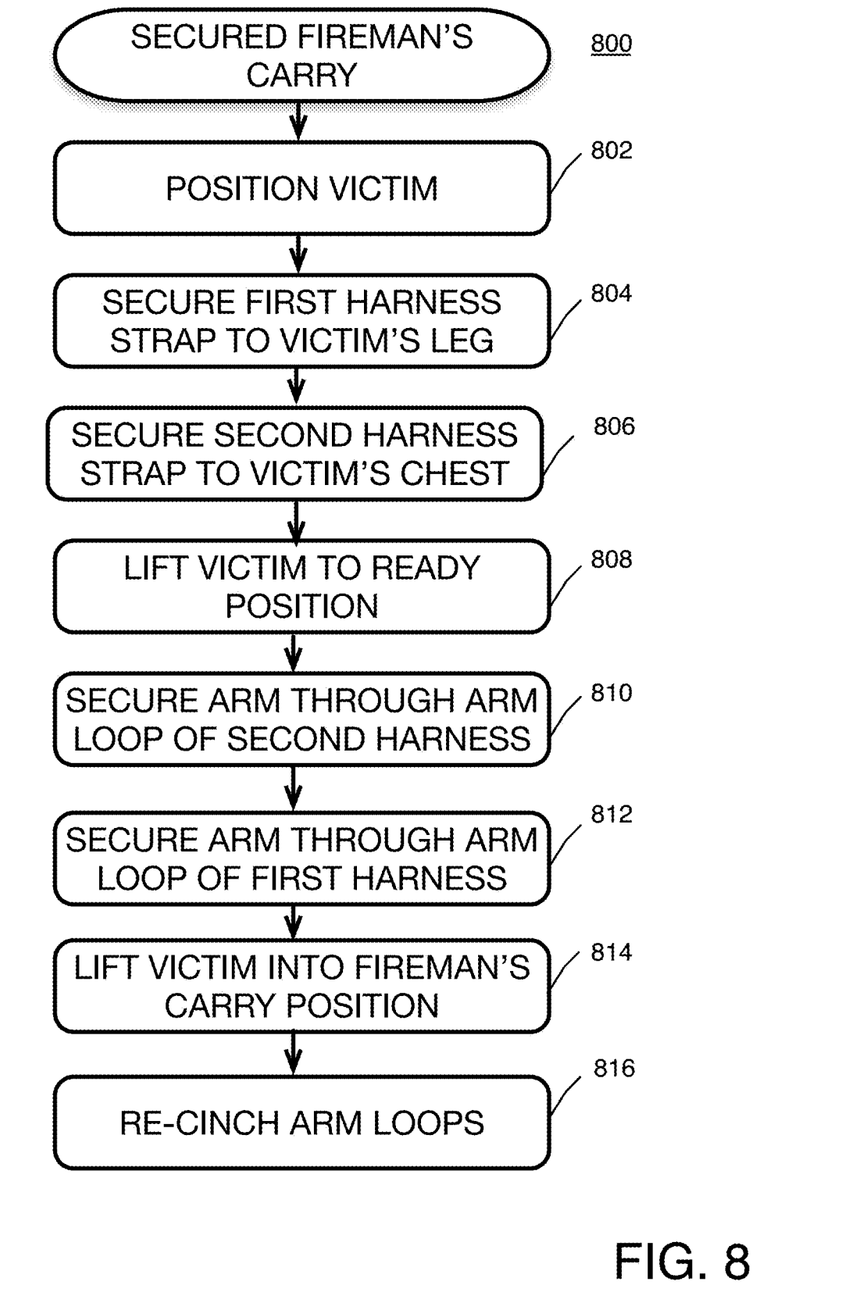
FIG. 8 is a flow diagram depicting the actions or steps involved in utilizing an exemplary embodiment of the harness system to lift and position a victim into a secured fireman's carry.

FIG. 8 is a flow diagram depicting the actions or steps involved in utilizing an exemplary embodiment of the harness system to lift and position a victim into a secured fireman's carry. The method 800 illustrates exemplary steps that can be performed to secure a victim into a fireman's carry. It should be understood that variations in the described steps may be performed depending on the location of the victim, position of the victim, condition of the victim, injuries that may have occurred to victim, etc. and as such, the illustrated steps or actions are simply a non-limiting example of one method to utilize the harness system to secure the victim into a secured fireman's carry. It should also be understood that the actions presented in FIG. 8 are not necessarily in a required order and, as such, some of the actions can be performed in a different order. It should also be understood that the harness system can be attached to either the left or right leg of the victim, although the actions presented in FIG. 8 may be described in only one manner.

Initially, when the carrier, such as a rescue worker, approaches the victim, the carrier should position the victim into an initial position 802. Preferably, the initial position involves ensuring that the victim is lying on their stomach face down. The carrier, either alone or with assistance, lays out the first harness assembly and the second harness assembly to ensure that the straps are not tangled, knotted or twisted. The carrier may then unlatch the connection securement device 112 (if not already unlatched) of the first adjustable strap 102 of the first harness assembly and then secure 804 the first adjustable strap 102 of the first harness assembly around the chest of the victim, latch the connection securement device 112 and then cinch the first adjustable strap 102 by pulling the loose end 110 causing the first adjustable strap to traverse through the adjustable buckle 106.

The carrier may then unlatch the connection securement device 112 (if not already unlatched) of the first adjustable strap of the second harness assembly and then secure 806 the first adjustable strap 102 of the second harness assembly around the leg, such as the right or left leg of the victim, or in some cases even around both legs, latch the connection securement device 112 and then cinch the first adjustable strap 102 by pulling on the loose end 110 causing the first adjustable strap to traverse through the adjustable buckle 106.

Once the first and second harness assemblies are secured to the victim, the carrier then lifts the victim to the ready position 808, in which the victim is held in an upright standing position facing the carrier and the carrier places their leg between the legs of the victim. If the second harness assembly is secured to the victims left leg, the carrier places their left leg between the legs of the victim and if the second harness assembly is secured to the right leg of the victim, the carrier places their right leg between the legs of the victim.

Assuming that the second harness assembly has been secured to the right leg of the victim, from the ready position, the carrier then positions the second adjustable strap 104 of the second harness assembly such that the slide fastener 200 is proximate to the front of the victim's right leg, and then the carrier squats down and inserts their right arm through the second adjustable strap 104 of the second harness assembly. Using their left hand, the carrier then pulls on the loose end 120 of the second adjustable strap 104 to pull the second adjustable strap 104 through the adjustable buckle 116 and thus cinch and secure the second adjustable strap 104 of the second harness assembly around the right shoulder and armpit of the carrier 810.

From this position, the carrier can allow the victim to drape over the carrier's right shoulder behind the carrier's neck. The carrier can then reach upward and insert their left arm through the second adjustable strap 104 of the first harness assembly. Using their right hand, the carrier then pulls on the loose end 110 of the second adjustable strap 104 to pull the second adjustable strap 104 through the adjustable buckle 116 and thus cinch and secure the second adjustable strap 104 of the first harness assembly around the left shoulder and armpit of the carrier 812.

It should be appreciated that in operation, the carrier may first insert their arm through the second adjustable strap of the first harness assembly and then insert their other arm through the second strap of the second harness assembly. In this method, the carrier, facing the victim, can insert their left arm through the second adjustable strap 104 of the first harness assembly, rotating their back to the front of the victim in a clockwise manner until almost facing the victim again, then squatting down to insert their right arm through the second adjustable strap 104 of the second harness assembly.

In either case, the carrier can then stand upright by straightening their legs to lift the victim into the fireman's carry position 814. Once in the fireman's carry position, the carrier may then pull on the loose ends 110 of the second adjustment straps 104 of the first and second harness assemblies to re-cinch or further cinch and secure the victim into position 816.

At this point the victim is now in a secured fireman's carry, held onto the shoulders of the carrier similar to a backpack and both arms and hands of the carrier are available to assist the carrier in transporting the victim to safety.

It should be appreciated that in some rescue scenarios, low visibility and a sense of urgency depending on the condition of the victim and the adverse and/or perilous conditions of the environment may pose difficulty in properly utilizing the harness assemblies. As such, the various embodiments of the harness assembly may employ one or more mechanisms to assist the carrier in the proper use of the harness assembly. One such mechanism is to use different colors for the first adjustable strap and the second adjustable strap. For instance, one adjustable strap may be a bright fluorescent orange and the other adjustable strap may be a bright florescent green as a non-limiting example. Further, some embodiments may utilize reflective material or different colors of reflective material to identify the straps. Some embodiments may utilize brightly colored arrows to point to the buckles and/or ends of the strap. Some embodiments may utilize phosphoric material so that the straps or portions thereof glow in the dark. Further, in some embodiments, different colored light emitting diodes (LEDS) may be attached to or embedded within the straps. In some embodiments, the LEDS may strobe to further facilitate use of the harness assembly. Even further, the LEDS on different elements of the harness assembly may strobe at different rates to further distinguish the different elements. Further, the loose ends of the straps may also utilize a bright and different color, reflective material and/or LEDS so that the carrier can quickly find the loose ends necessary to cinch the straps to the victim or carrier. Even further, the connecting securement device for the first adjustable straps may also utilize a contrasting bright color, reflective material and/or LEDS to help the carrier locate the connecting securement device.

In some embodiments, LEDS may be attached to or embedded in various elements of the harness assembly that turn on or flash only when that element needs to be utilized. For instance, initially, LEDS in the first adjustable strap may be illuminated when the connecting securement device is unlatched. Once the connecting securement device is re-latched with the first adjustable strap around the victim, LEDS on the second adjustable strap can be illuminated.

While the embodiments have been described as utilizing straps, it should be appreciated that flexible bands may also be utilized. For instance, the first adjustable straps may be adjustable bands in some embodiments. Further, the second adjustable straps maybe adjustable or even fixed sized bands that the carrier can easily slide their arms through. Further, in some embodiments, the second adjustable straps or adjustable bands or fixed sized bands may include a series of beads or round objects that the strap or band is threaded through such that as the carrier slides their arm through the straps or bands, the beads or objects roll thus increasing the ease of the carrier in inserting their arms.

In some embodiments, one or both of the adjustable straps may include a padding to provide comfort and to prevent the straps from causing harm to the victim and/or carrier. The padding may be a tube structure that the strap is threaded through or may be a wrap-around structure that is secured with hook and loop material such as VELCRO, snaps or the like.

In some embodiments, the slide fastener 200 as presented in FIG. 1, FIG. 2 and FIG. 3 may utilize a releasable structure, such as a carabiner coupling the straps together or a carabiner on one strap connecting to a ring on the other strap. Advantageously, this mechanism or structure can allow the carrier to secure the second adjustable straps around their left and right shoulders and armpits prior to commencing the fireman's carry. In such embodiments, the carrier would then secure the first adjustable straps to the victim as described above, and then once the victim is in the ready position (as depicted in action 808 of FIG. 8) the carrier can then attach the carabiner of the second adjustable straps to the first adjustable straps. Further, this configuration also has the advantage of a quick release of the victim once the victim is carried to a safe location. A further advantage of such an embodiment is that the carrier has fewer procedures and straps to deal with upon reaching a victim. As such, the carrier can carry a set of first adjustable straps to the site of a victim while already wearing a set of second adjustable straps. The carrier can then perform a quick release of the victim at a location of safety and return to a next victim carrying another set of first adjustable straps.

In each of the embodiments, the combination of the various straps, bands, buckles and attachment mechanisms or structures should all take into consideration the overall breaking strength of the harness assembly and harness system. The weakest element in the structure of the harness assembly will define the overall breaking strength of the harness assembly and as such, materials and devices should be selected to ensure a proper breaking strength.

The present invention has been described using detailed descriptions of embodiments thereof that are provided by way of example and are not intended to limit the scope of the invention. The described embodiments comprise different features, not all of which are required in all embodiments of the invention. Some embodiments of the present invention utilize only some of the features or possible combinations of the described features. Variations of embodiments of the present invention that are described and embodiments of the present invention comprising different combinations of features noted in the described embodiments will occur to persons of ordinary skill in the related art.

It will be appreciated by persons skilled in the art that the present invention is not limited by what has been particularly shown and described herein above. Rather the scope of the invention is defined by the claims that follow.

What is claimed is:

1. An apparatus to assist a fireman's carry of a victim, the apparatus comprising:
    a first adjustable loop formed by a first strap, wherein a first end of the first strap is attached to a first piece of an attachment buckle and a second end of the first strap is adjustably associated with a first adjustable slide buckle, wherein the first adjustable slide buckle is also associated with a second piece of the attachment buckle, wherein the first strap is configured to be looped and secured around a body part of a victim by connecting the first piece and the second piece of the attachment buckle;
    a second adjustable loop formed by a second strap, wherein a first end of the second strap is associated with a second adjustable slide buckle and a second end of the second strap is adjustably associated with the second adjustable slide buckle, wherein the second adjustable loop is configured to be slid over the shoulder and under arm of a carrier; and
    a slide fastener configured to couple the first adjustable strap to the second adjustable strap such that one or more of the first adjustable strap and second adjustable strap is configured to be slid through an eyelet of the slide fastener;
    whereby upon placement of the first adjustable strap around a chest or a leg of the victim the carrier lifts and secure the victim in a fireman's carry.

2. The apparatus of claim 1, wherein the second piece of the attachment buckle is configured to allow the first adjustable loop to be cinched around the body part of the victim or loosened.

3. The apparatus of claim 2, wherein the adjustable slide buckle is configured to allow the second adjustable loop to be cinched around the shoulder and under arm of the carrier or loosened.

4. The apparatus of claim 3, wherein the attachment buckle and the first slide buckle are two distinct elements and wherein the first adjustable loop is composed of a first segment and a second segment, wherein a first end of the first segment of the first adjustable loop is attached to the first piece of the attachment buckle and a second end of the first segment of the first adjustable loop is adjustably associated with the first adjustable slide buckle, wherein a first end of the second segment of the first adjustable loop is associated with a second piece of the attachment buckle and a second end of the second segment of the first adjustable loop is attached to a bar of the first adjustable slide buckle.

5. The apparatus of claim 4, wherein the first piece and the second piece of the attachment buckle connect in a male-female configuration and include a releasable latching mechanism to secure the first piece and the second piece together.

6. The apparatus of claim 4, wherein the first piece and the second piece of the attachment buckle connect together using a hook and loop material.

7. The apparatus of claim 4, wherein the first piece and the second piece of the attachment buckle include a carabiner and a receiver and wherein the first piece and second piece are releasably connected together by attaching the carabiner to the receiver.

8. The apparatus of claim 7, wherein the receiver is a second carabiner.

9. The apparatus of claim 3, wherein the attachment buckle and the slide buckle are integral to each other.

10. The apparatus of claim 3, wherein the second adjustable loop is associated with the second adjustable slide buckle by being attached to a bar of the second adjustable buckle.

11. The apparatus of claim 3, wherein the second adjustable loop is configured identically to the first adjustable loop.

12. The apparatus of claim 11, wherein the first adjustable strap is fixedly attached to a bar of the slide fastener.

13. The apparatus of claim 11, wherein the second adjustable strap is fixedly attached to a bar of the slide fastener.

14. The apparatus of claim 3, wherein the attachment buckle and the first slide buckle are two distinct elements and wherein the first adjustable loop is composed of a first segment and a second segment, wherein a first end of the first segment of the first adjustable loop is attached to the first piece of the attachment buckle and a second end of the first segment of the first adjustable loop is adjustably associated with the first adjustable slide buckle, wherein a first end of the second segment of the first adjustable loop is associated with a second piece of the attachment buckle and a second end of the second segment of the first adjustable loop is attached to a bar of the first adjustable slide buckle; and
    wherein the second adjustable loop includes a second attachment buckle and the second attachment buckle and the second slide buckle are two distinct elements and wherein the second adjustable loop is composed of a first segment and a second segment, wherein a first end of the first segment of the second adjustable loop is attached to a first piece of the second attachment buckle and a second end of the first segment of the second adjustable loop is adjustably associated with the second adjustable slide buckle, wherein a first end of the second segment of the second adjustable loop is associated with a second piece of the second attachment buckle and a second end of the second segment of the second adjustable loop is attached to a bar of the second adjustable slide buckle.

15. The apparatus of claim 14, wherein the first piece and the second piece of the attachment buckle and the first piece and the second piece of the second attachment buckle connect in a male-female configuration and include a releasable latching mechanism to secure the first pieces and the second pieces together.

16. The apparatus of claim 14, wherein the first piece and the second piece of the first attachment buckle and the second attachment buckle connect together using a hook and loop material.

17. The apparatus of claim 4, wherein the first piece and the second piece of the first attachment buckle and the second attachment buckle include a carabiner and a receiver and wherein the first pieces and second pieces are releasably connected together by attaching the carabiner to the receiver.

18. The apparatus of claim 17, wherein the receiver is a second carabiner.

19. The apparatus of claim 3, wherein the first attachment buckle and the first slide buckle are integral to each other and the second attachment buckle and the second slide buckle are integral to each other.

* * * * *